US012368865B2

(12) United States Patent
Jung

(10) Patent No.: US 12,368,865 B2
(45) Date of Patent: Jul. 22, 2025

(54) UPDATING AN OBJECTIVE QUALITY SCORE OF A VIDEO FLOW AND PROCESSING A VIDEO FLOW

(71) Applicant: Tencent Cloud Europe (France) SAS, Paris (FR)

(72) Inventor: Joël Jung, Paris (FR)

(73) Assignee: Tencent Cloud Europe (France) SAS, Paris (FR)

(*) Notice: Subject to any disclaimer, the term of this patent is extended or adjusted under 35 U.S.C. 154(b) by 109 days.

(21) Appl. No.: 18/227,544

(22) Filed: Jul. 28, 2023

(65) Prior Publication Data

US 2023/0379476 A1 Nov. 23, 2023

Related U.S. Application Data

(63) Continuation of application No. PCT/IB2021/000085, filed on Feb. 8, 2021.

(51) Int. Cl.
*H04N 19/154* (2014.01)
*A63F 13/52* (2014.01)
*G06T 7/00* (2017.01)

(52) U.S. Cl.
CPC ........... *H04N 19/154* (2014.11); *A63F 13/52* (2014.09); *G06T 7/0002* (2013.01)

(58) Field of Classification Search
CPC ...... H04N 19/154; A63F 13/52; G06T 7/0002
See application file for complete search history.

(56) References Cited

U.S. PATENT DOCUMENTS

| | | | |
|---|---|---|---|
| 11,165,848 B1* | 11/2021 | Larson | H04N 19/154 |
| 2020/0322694 A1* | 10/2020 | Colligan | H04N 21/8547 |
| 2023/0379551 A1* | 11/2023 | Ashwathappa | H04N 21/23418 |

OTHER PUBLICATIONS

International Search Report issued Oct. 28, 2021 in Application No. PCT/IB2021/000085, pp. 1-13.

* cited by examiner

Primary Examiner — James T Boylan
(74) Attorney, Agent, or Firm — ArentFox Schiff LLP

(57) ABSTRACT

Aspects of the disclosure provides a method for updating an objective quality score of a video flow. The method includes determining the objective quality score of the video flow that is generated based at least on a game scenario. The objective quality score can indicate a quality of the video flow. The method further includes updating the objective quality score based on a mapping function parameterized by at least one update parameter. The at least one update parameter can be dependent on at least one characteristic of the game scenario and at least one characteristic of a video encoder that is configured to encode the video flow. Apparatus and non-transitory computer-readable storage medium counterpart embodiments are also contemplated.

20 Claims, 8 Drawing Sheets

[Fig. 1]
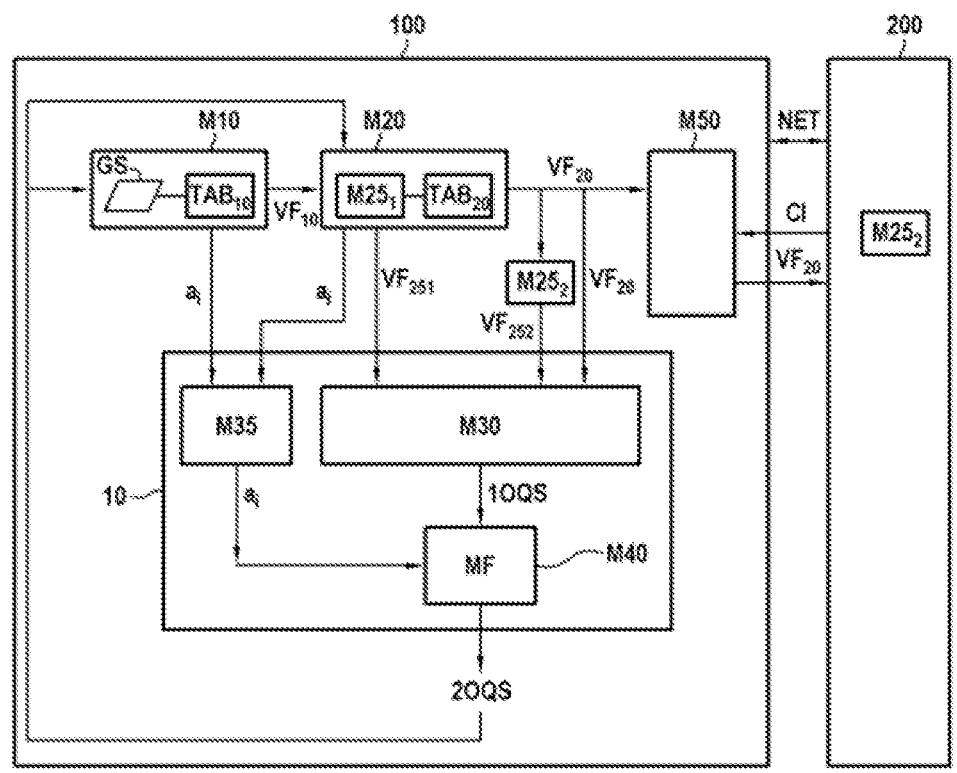

[Fig. 2]
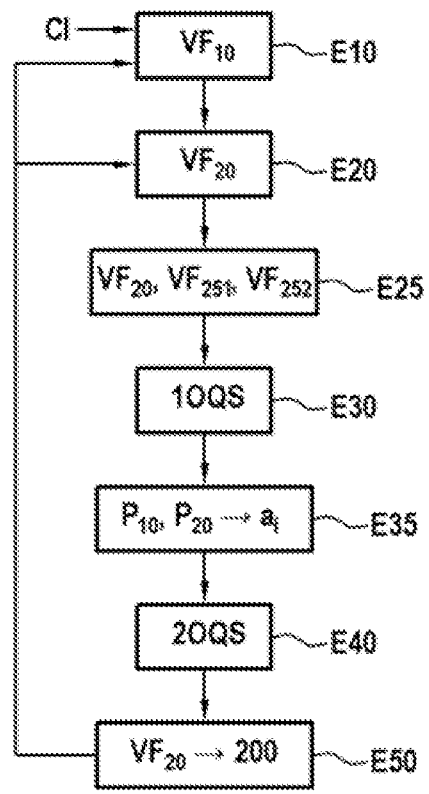
[Fig. 3]
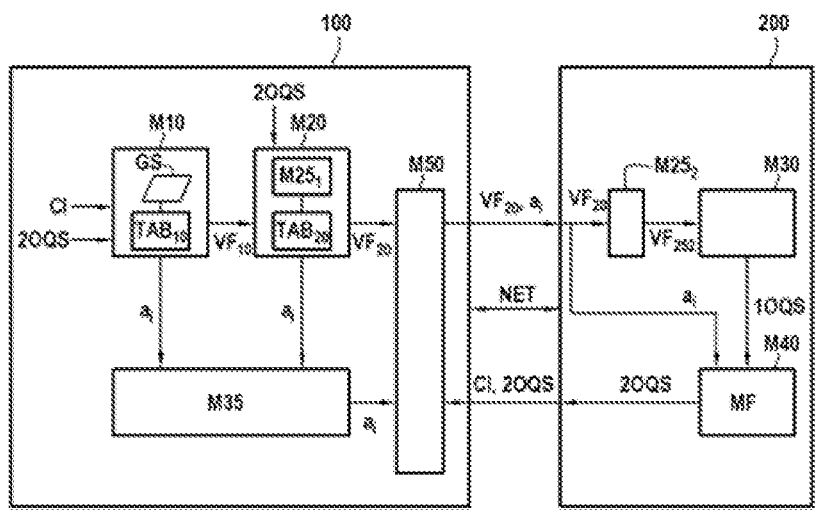

[Fig. 4]
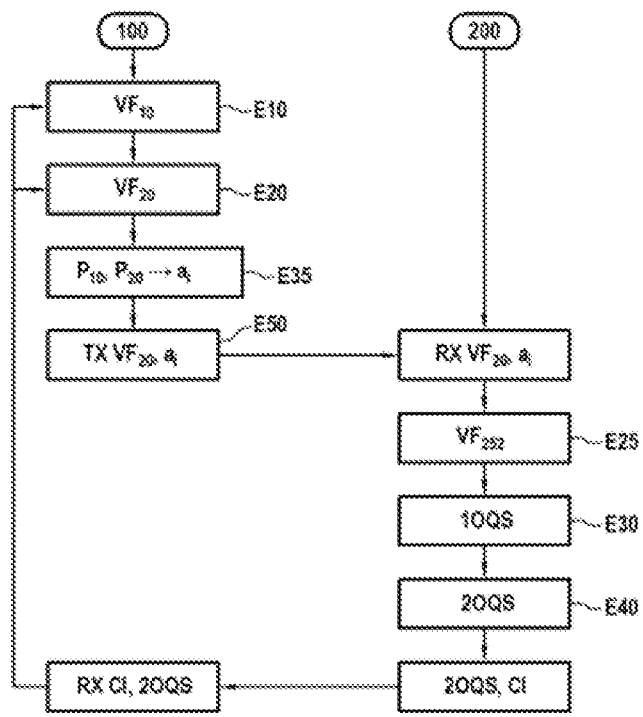
[Fig. 5]
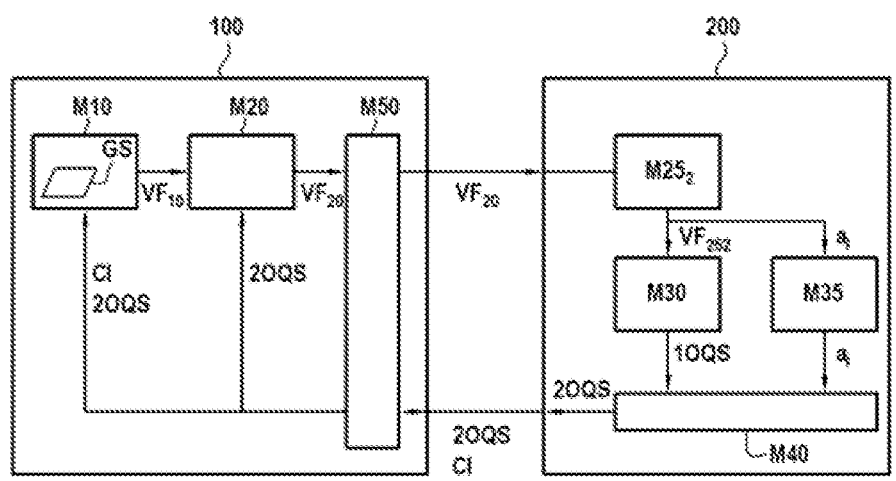

[Fig. 6]
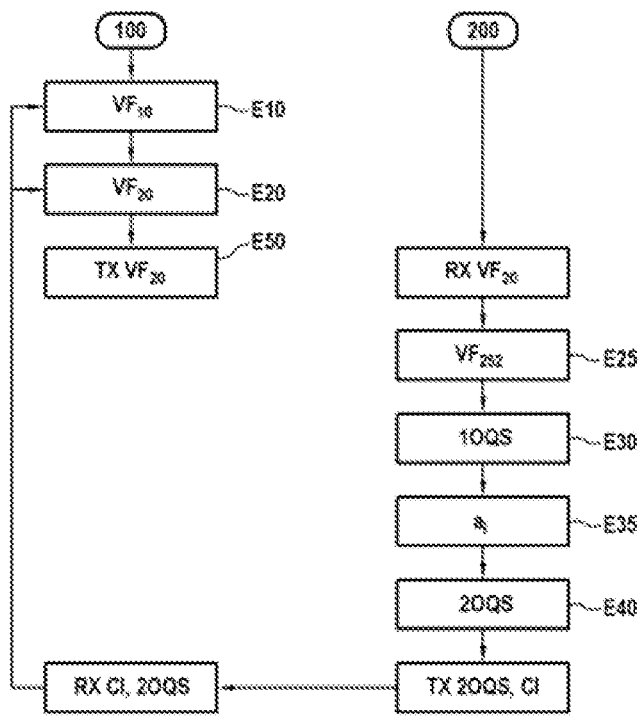
[Fig. 7]
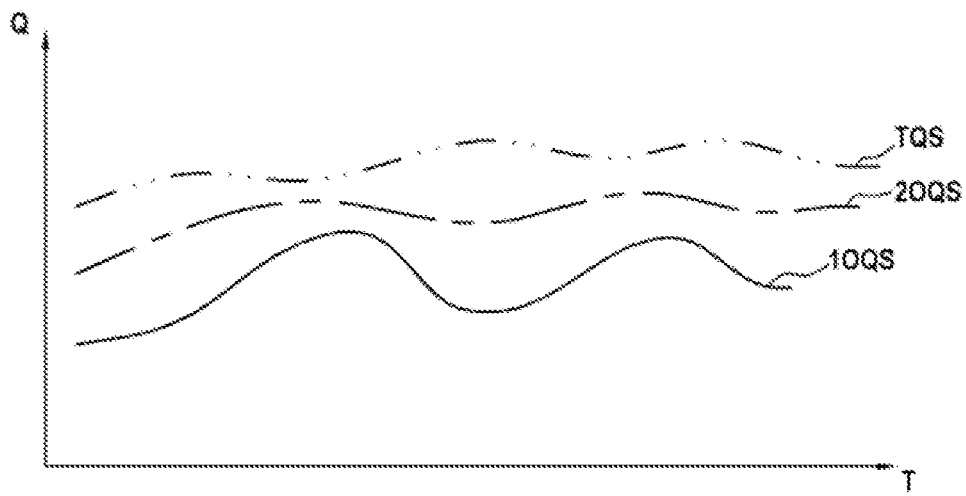

[Fig. 8A]
| | | TY1 | TY2 | TY3 |
|---|---|---|---|---|
| $MF_L$ | a1 | 0,3 | -0,6 | 0,3 |
| | a2 | 0,9 | 0,4 | -0,5 |
| $MF_Q$ | a1 | 0,5 | 0,1 | -0,6 |
| | a2 | -0,5 | 0,5 | 0,4 |
| | a3 | 0,3 | 0,9 | -0,2 |
| $MF_C$ | a1 | -0,3 | 0,1 | -0,7 |
| | a2 | -0,4 | 0,5 | 0,1 |
| | a3 | -1,0 | 0,5 | 0,4 |
| | a4 | 0,6 | 1,0 | 0,6 |
| $MF_{LN}$ | a1 | 0,1 | 0,4 | 0,3 |
| | a2 | -0,7 | 0,5 | -0,3 |
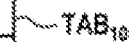
[Fig. 8B]
| | | GS1 | GS2 |
|---|---|---|---|
| $MF_L$ | a1 | -1,0 | 0,0 |
| | a2 | 0,4 | 0,1 |
| $MF_Q$ | a1 | -0,2 | 0,1 |
| | a2 | 0,4 | 1,0 |
| | a3 | 0,1 | -0,8 |
| $MF_C$ | a1 | 0,0 | -0,6 |
| | a2 | 0,1 | 0,8 |
| | a3 | 0,4 | 0,7 |
| | a4 | 0,8 | -0,8 |
| $MF_{LN}$ | a1 | 0,8 | -0,6 |
| | a2 | 0,8 | -0,6 |
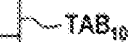

[Fig. 8C]

|  |  | GS1 | | | GS2 | |
|---|---|---|---|---|---|---|
|  |  | SC1 | SC2 | SC3 | SC1 | SC2 |
| $MF_L$ | a1 | 0,8 | -0,4 | -0,2 | 0,9 | 1,0 |
|  | a2 | -0,4 | 0,1 | 0,3 | 1,0 | 0,3 |
| $MF_Q$ | a1 | 0,9 | -0,1 | 0,3 | 0,5 | 0,8 |
|  | a2 | -0,4 | 0,2 | -1,0 | 0,0 | -0,7 |
|  | a3 | -0,2 | 0,9 | -0,8 | -0,1 | 1,0 |
| $MF_C$ | a1 | -0,1 | 0,6 | -0,7 | 1,0 | -1,0 |
|  | a2 | 0,1 | -1,0 | -0,3 | 1,0 | 0,5 |
|  | a3 | -0,3 | -0,4 | -0,4 | 1,0 | -0,3 |
|  | a4 | 0,6 | 0,6 | 0,7 | -0,9 | -0,3 |
| $MF_{LN}$ | a1 | -0,2 | -0,8 | 0,0 | -0,2 | -0,7 |
|  | a2 | 0,6 | 0,5 | 1,0 | -0,8 | 0,6 |

$\sim TAB_{10}$

[Fig. 8D]

|  |  | <TH1 | [TH1, TH2] | >TH2 |
|---|---|---|---|---|
| $MF_L$ | a1 | 0,8 | 0,4 | -0,5 |
|  | a2 | -0,7 | -0,1 | -1,0 |
| $MF_Q$ | a1 | 1,0 | -0,2 | 1,0 |
|  | a2 | -0,7 | -0,9 | -0,4 |
|  | a3 | -0,1 | 0,1 | -0,1 |
| $MF_C$ | a1 | 0,3 | 0,4 | -0,9 |
|  | a2 | -0,9 | -0,9 | -1,0 |
|  | a3 | 0,3 | 0,0 | 0,8 |
|  | a4 | -0,3 | 0,3 | -0,1 |
| $MF_{LN}$ | a1 | 0,5 | -0,5 | -0,1 |
|  | a2 | 0,2 | 0,5 | -0,5 |

$\sim TAB_{10}$

[Fig. 8E]

|  |  | AVC | HEVC | VVC | VP9 | AV1 | AVS |
|---|---|---|---|---|---|---|---|
| $MF_L$ | a1 | -0,1 | -0,1 | 0,8 | 0,8 | -0,4 | 0,4 |
|  | a2 | 0,4 | -0,4 | 1,0 | 0,9 | 0,0 | 0,8 |
| $MF_Q$ | a1 | 0,0 | 0,1 | -0,4 | 0,7 | 0,2 | 0,0 |
|  | a2 | 0,0 | -0,7 | -0,8 | -0,6 | 0,2 | 0,1 |
|  | a3 | -0,2 | 0,2 | -0,7 | -0,6 | 0,9 | -0,3 |
| $MF_C$ | a1 | 0,9 | 1,0 | -0,3 | -1,0 | 1,0 | 0,8 |
|  | a2 | -0,6 | 0,0 | 0,5 | 0,7 | -0,4 | -0,2 |
|  | a3 | 0,7 | 0,4 | 0,5 | 0,4 | 0,7 | -0,7 |
|  | a4 | -0,3 | -0,1 | 0,0 | -1,0 | 0,9 | -0,1 |
| $MF_{LN}$ | a1 | 0,1 | 0,2 | 0,4 | -0,2 | -0,6 | 0,5 |
|  | a2 | -0,5 | 0,9 | -0,2 | -0,7 | -0,1 | 0,3 |

$TAB_{20}$

[Fig. 8F]

|  |  | AVC | | | HEVC | | |
|---|---|---|---|---|---|---|---|
|  |  | 0 - 10 | 10 - 20 | 20 - 30 | 0 - 10 | 10 - 20 | 20 - 30 |
| $MF_L$ | a1 | -0,1 | 0,2 | -0,1 | 0,5 | -0,5 | -0,6 |
|  | a2 | 0,7 | 0,8 | 0,9 | -0,2 | 0,6 | 0,7 |
| $MF_Q$ | a1 | 0,4 | -0,6 | -0,1 | 0,1 | 0,5 | -0,7 |
|  | a2 | -1,0 | -0,5 | -0,2 | 0,4 | -0,9 | 0,9 |
|  | a3 | -0,7 | 0,5 | 0,2 | 1,0 | 0,5 | 0,5 |
| $MF_C$ | a1 | 0,3 | -0,2 | 0,0 | 0,2 | -0,1 | -0,4 |
|  | a2 | 0,7 | 0,0 | 0,2 | -1,0 | -0,1 | 1,0 |
|  | a3 | 0,0 | 0,5 | 0,0 | 0,6 | -0,9 | 0,2 |
|  | a4 | -0,1 | 0,8 | 0,4 | 1,0 | -1,0 | 0,1 |
| $MF_{LN}$ | a1 | 0,4 | -0,2 | 0,3 | 0,3 | -0,8 | 0,1 |
|  | a2 | -0,3 | -0,6 | -0,1 | -0,5 | -0,2 | 0,4 |

$TAB_{20}$

[Fig. 9]
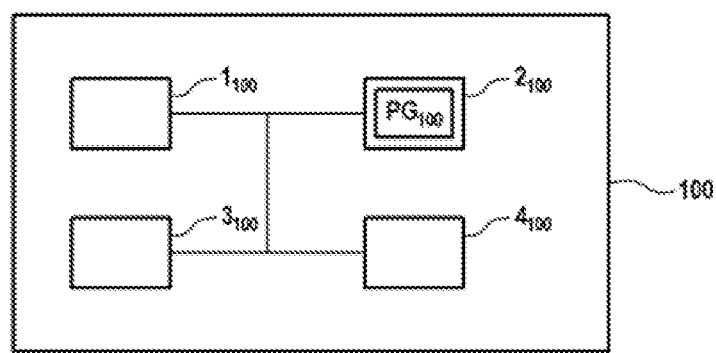
[Fig. 10]
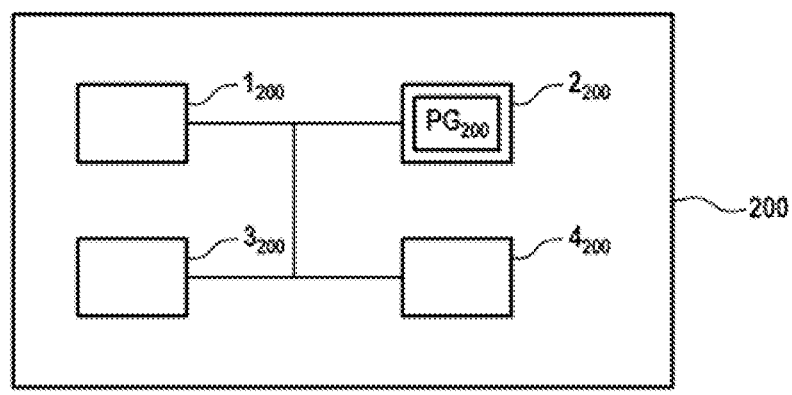

UPDATING AN OBJECTIVE QUALITY SCORE OF A VIDEO FLOW AND PROCESSING A VIDEO FLOW

RELATED APPLICATION

The present application is a continuation of International Application No. PCT/IB2021/000085, entitled "METHODS AND SYSTEMS FOR UPDATING AN OBJECTIVE QUALITY SCORE OF A VIDEO FLOW AND FOR PROCESSING A VIDEO FLOW" and filed on Feb. 8, 2021. The entire disclosure of the prior application is hereby incorporated by reference in its entirety.

FIELD OF THE TECHNOLOGY

The disclosure relates to the general field of video communication, including systems and methods to improve the performance of image and video quality evaluation.

BACKGROUND OF THE DISCLOSURE

The disclosure can be applied to any type of video including but not limited applications for interactive services, e.g., online gaming services, e.g., provided in a cloud environment.

SUMMARY OF THE DISCLOSURE

In an embodiment, a method of for updating an objective quality score of a video flow includes determining the objective quality score of the video flow that is generated based at least on a game scenario. The objective quality score can indicate a quality of the video flow. The method includes updating the objective quality score based on a mapping function parameterized by at least one update parameter. The at least one update parameter can be dependent on at least one characteristic of the game scenario and at least one characteristic of a video encoder that is configured to encode the video flow.

In an embodiment, an apparatus for updating an objective quality score of a video flow includes processing circuitry. The processing circuitry is configured to determine the objective quality score of the video flow that is generated based at least on a game scenario. The objective quality score can indicate a quality of the video flow. The processing circuitry is configured to update the objective quality score based on a mapping function parameterized by at least one update parameter. The at least one update parameter can be dependent on at least one characteristic of the game scenario and at least one characteristic of a video encoder that is configured to encode the video flow.

In an embodiment, a non-transitory computer-readable storage medium stores instructions which when executed by at least one processor cause the at least one processor to perform a method of for updating an objective quality score of a video flow. The method includes determining an objective quality score of the video flow that is generated based at least on a game scenario. The objective quality score can indicate a quality of the video flow. The method further includes updating the objective quality score based on a mapping function parameterized by at least one update parameter. The at least one update parameter can be dependent on at least one characteristic of the game scenario and at least one characteristic of a video encoder that is configured to encode the video flow.

BRIEF DESCRIPTION OF THE DRAWINGS

Characteristics and advantages of the present disclosure are described below, with reference to the drawings which illustrate exemplary embodiments thereof devoid of any limiting character. In the figures:

FIG. 1 shows a video flow processing system according to some embodiments of the disclosure;

FIG. 2 shows in flowchart the main steps of a method of processing a video according to some embodiments of the disclosure;

FIG. 3 shows a video flow processing system according to some embodiments of the disclosure;

FIG. 4 shows in flowchart the main steps of a method of processing a video according to some embodiments of the disclosure;

FIG. 5 shows a video flow processing system according to some embodiment of the disclosure;

FIG. 6 shows in flowchart the main steps of a method of processing a video according to some embodiments of the disclosure;

FIG. 7 shows target quality scores, objective quality scores and updated objective quality scores;

FIGS. 8A to 8F show examples of parameters used to update an objective quality score according to embodiments of the disclosure;

FIG. 9 shows a server according to an embodiment of the disclosure;

FIG. 10 shows a client device according to an embodiment of the disclosure.

DETAILED DESCRIPTION DISCLOSURE

The following describes technical solutions in embodiments of this disclosure with reference to the accompanying drawings. The described embodiments are some of the embodiments of this disclosure rather than all of the embodiments. Other embodiments are within the scope of this disclosure.

In an online gaming application, a gamer uses a client device to access a game whose scenes are generated by a remote server. The gamer's motion and control information (CI), obtained from the input devices, is captured and transmitted from the client to the server. The client can be a personal computer or a mobile phone.

On the server side, the received motion and control information may affect the game scene generation. By analysing the generated game scenes and/or the user's motion and control information, the new scene is rendered by the game engine.

The corresponding raw video rendered by the game engine is encoded and the bit-stream can be sent back to the client. On the client side, the bit-stream is decoded and the pictures of the game are displayed. In some examples, an advantage of cloud gaming includes that expensive game consoles or PCs are no longer required on the client side, and the cloud gaming servers are continuously upgraded as technology develops, at no additional cost to the consumer.

Objective quality evaluation refers to the evaluation of the perceptual quality of an image or a video, for example, in order to predict automatically the subjective quality as perceived, for example, by human observers (e.g., through mean opinion scores).

In a cloud-gaming context, in an example, having a reliable objective metric is a key differentiating factor for a service provider. When used in the cloud, the metric allows adapting the characteristics of the game engine and of the video coder, to ensure that the video stream sent to the user has sufficient quality. When used at the client side, the metric provides important information on the quality as perceived by the user. When sent back to the server through a feedback channel, the metric can influence the behaviour of the game engine and the coder.

For example, when the end-to-end delay is increased, the temporal and spatial complexity of the game may be adapted to maintain a constant quality of gaming experience.

In some embodiments, the metric described above are not sufficient, especially for online gaming.

In various examples, gaming content has particular characteristics. For example, the game content is computer generated, can have very fast motions, can be interleaved with no motion scenes, can have large and sudden shifts of luminosity, etc.

In various examples, for a video game provider, developing objective metrics for gaming content, such as a new metric for a new game, or for a new version of a game, is a complex operation. In an embodiment, the advantages of using the objective metrics are linked with the drawbacks of subjective evaluation methods. In an example, the drawbacks of subjective evaluation methods include that the subjective evaluation methods may require dedicated labs and environments, cannot be automated, can be costly and time consuming, and/or cannot be used for real time assessment of the quality. Objective metrics may have drawbacks, for example, it can be a challenge to make the objective metrics correlate well with human perception, for example when no reference signal is available to compare with. In an example, they require high computational resources, they are not able to deal with various source of quality-affecting parameters, and are most of the time dedicated to a restricted context, situation bit-rate level, type of content, type of artefacts, etc.

The present disclosure can overcome at least some of the above-mentioned disadvantages.

Thus, and according to an aspect, the disclosure proposes a method (hereafter "the updating method") of updating an objective quality score of a video flow, wherein the video flow is generated at least according to a scenario (e.g., a game scenario or a game), encoded by a video encoder and decoded by a video decoder, the method comprising the steps of:
  determining an objective quality score of the video flow after the encoding step or after the decoding step;
  obtaining at least one update parameter to update the objective quality score, this parameter being dependent on at least one characteristic among a characteristic of the scenario and a characteristic of the video encoder; and
  updating the objective quality score by using a mapping function parameterized by the at least one update parameter.

Correlatively, the disclosure also relates to a system (hereafter "the updating system") for updating an objective quality score of a video flow, wherein the video flow is generated at least according to a scenario, encoded by a video encoder and decoded by a video decoder, the system comprising:
  a module for determining an objective quality score of the video flow after the encoding step or after the decoding step;
  a module for obtaining at least one update parameter to update the objective quality score, this parameter being dependent on at least one characteristic among a characteristic of the scenario and a characteristic of the video encoder; and
  a module for updating the objective quality score by using a mapping function parameterized by the at least one update parameter.

In one embodiment of the video flow processing method, the video flow is generated according to the scenario and according to control information received from the client device via the communication network.

In one embodiment of the above mentioned methods, the scenario defines rules of an online game.

The disclosure can include updating a score computed by an objective quality metric (or an objective metric).

This objective metric may be of any type. It may not have been specifically designed considering the gaming content or the encoding bit rate. It may be a full-reference metric using a source signal, a reduced-reference metric using samples of the source signal, or a no-reference, not using the source signal.

In one embodiment of the methods, the objective metric has been defined using target quality scores of a set of video flows.

This objective metric may be of a peak signal-to-noise ratio (PSNR), a multi-scale structural similarity index measure (MS-SSIM), and a video multimethod assessment fusion (VMAF) type.

In one embodiment, the target quality scores are subjective quality scores of the set of video flows, e.g., mean opinion scores. In another embodiment, the target quality scores are objective quality scores associated with a predetermined second metric, e.g. possibly more complex than the above mentioned objective metric.

The disclosure includes updating the score computed by the above described objective metric by taking into account characteristic of the scenario (e.g., the game) and/or the video encoder.

Thus, when the online gaming provider offers a new game or a new version of a game, the provider can determine an appropriate set of update parameters, for example, during a training phase. The process of determining the set of update parameters is much less complex than defining a new metric.

Video games can have different characteristics, based on the category the video games belong to, such as action, shooter, adventure, role-playing, simulation, strategy, cards, etc. Even within a single game, different scenes have different characteristics, such as video introduction, screen for settings selection, core action, etc. It is a specificity of gaming content to offer such a variety of characteristics, that comes in addition to extremely sudden fast motions, interleaved with very quiet and slow motions scenes.

The game engine has knowledge about the above described information and characteristics. The game engine can consequently provide "game characteristics", to control the selection of the most appropriate parameters of a mapping function.

In an embodiment, a training phase has been applied beforehand, so that sets of parameters for different mapping functions have been learned, based on the game characteristics. The advantage is that the selection of the score modification information, such as update parameter(s), can be straightforward, and can be repeated frequently at a low cost.

In one embodiment, the characteristics of the scenario used for determining the update parameters include one or more of:

an identifier of the scenario, e.g. a game identifier;
an identifier of an active part of the scenario, e.g. a scene of a game
a type of the scenario, e.g. a type of game;
information on a quantity of motion in the scenario or in a scene, e.g. temporal information, such as defined in recommendation ITU-T P.910 (April 2008), e.g. characteristics of motions of graphic objects moving in a synthetic scene of a game;
information on a quantity of spatial details in the scenario or in a scene, e.g. spatial information such as defined in recommendation ITU-T P.910 (April 2008), e.g. a number of discontinuities in images of the video flow.

Similarly, video encoders can have different characteristics and performances, that impact significantly on the quality of an encoded content. The mapping function can be a refinement of a provided score: adapting the parameters of the mapping function based on codec characteristics is an advantage.

The codec can provide "codec characteristics", to control the selection of the most appropriate parameters of a mapping function. In an embodiment, a training phase has been applied beforehand, so that sets of parameters for different mapping functions have been set, based on the codec characteristics.

In one embodiment, the characteristic of the video encoder used for determining the update parameters include the type and/or the bit-rate range of the video encoder.

In one embodiment, the mapping function is a logarithmic or polynomial function whose coefficients are determined from the parameters (e.g., the update parameter(s)).

For example, the mapping function is a linear function whose slope and intercept are determined from the parameters.

According to an aspect, the disclosure includes a method (hereafter "the video flow processing method") of processing a video flow The method can include:
generating the video flow by a video generation module comprised in a server, the video flow being generated at least according to a scenario;
encoding the video flow generated by a video encoder comprised in the server;
the server transmitting the encoded video flow to at least one client device via a communication network,
decoding the encoded video flow by the server or by the client device; and
determining and updating an objective quality score for the video flow by implementing the above mentioned updating method; and
using the updated objective score by the video generation module during the generating step and/or by the video encoder during the encoding step.

Correlatively, the disclosure also concerns a video flow processing system (hereafter "the video flow processing system") comprising a server and at least one client device configured to communicate over a network:
the server comprising:
(i) a video generation module for generating the video flow at least according to a scenario;
(ii) a video encoder configured to encode the video flow generated by the video generation module; and
(iii) a module for transmitting the encoded video stream to the at least one client device via
the system further comprising:
a module for decoding the encoded video flow;
a module for determining an objective quality score of the encoded video flow.

This video flow processing system comprises an updating system as mentioned above for updating the objective quality score, the generation module and/or the video encoder being configured to use the updated objective score.

Thus, the disclosure also proposes to process a video flow by injecting the updated objective score by in the video generation module for generating the video flow and/or in the video encoder for encoding the video flow, i.e. for generating the bit-stream.

In a variant of the disclosure, all processing steps for the implementation of the disclosure are performed by the server. In this variant, the disclosure does not require any specific processing at the client device.

In one embodiment of the video flow processing method, the objective quality score is determined by the server.

In one embodiment of the video flow processing method, the decoding step, and the steps of obtaining step and updating the quality objective score are carried out by the server.

In one embodiment of the video flow processing method, the objective quality score is determined by the server.

In another variant, the processes for the implementation of the disclosure are distributed between the server and the client.

In one embodiment of the video flow processing method, the objective quality score is determined by the client device.

In one embodiment of the video flow processing method, the decoding step, and the steps of obtaining step and updating the quality objective score are carried out by the client device.

In one embodiment of the video flow processing method:
the at least one parameter is obtained by the server and sent to the client device with the encoded video flow;
the mapping function is implemented by the client device to determine the updated quality objective score; and
the updated quality objective score is sent to the server by the client device.

The disclosure also concerns a set of computer programs comprising at least one computer program, the set of computer programs comprising instructions configured to implement the steps of the updating method and/or of the video flow processing method mentioned when the at least one computer program is executed by a computer.

These programs can use any programming language, and be in the form of source code, object code, or intermediate code between source code and object code, such as in a partially compiled form, or in any other desirable form.

The disclosure also concerns a readable medium comprising at least one computer program of this set of computer programs.

The recording medium can be any entity or device capable of storing the program. For example, the support may include a storage means, such as a ROM, for example a CD ROM or a microelectronic circuit ROM, or also a magnetic recording means, for example a hard disk.

On the other hand, the recording medium can be a transmissible medium such as an electrical or optical signal, which can be carried via an electrical or optical cable, by radio or by other means. The program according to the disclosure can be downloaded on an Internet-type network.

Alternatively, the recording medium can be an integrated circuit in which the program is incorporated, the circuit being adapted to execute or to be used in the execution of the method in question.

FIG. 1 shows a video flow processing system according to some embodiments of the disclosure.

FIG. 2 shows in flowchart steps (e.g., main steps) of a method of processing a video according to some embodiments of the disclosure. The video flow processing system in FIG. 1 can be configured to implement a method of processing a video. The method of processing a video shown in FIG. 2 can be implemented by any suitable video flow processing system. In an embodiment, the video flow processing system in FIG. 1 is configured to implement the method of processing the video in FIG. 2, such as described in the disclosure.

The video flow processing system of FIG. 1 comprises a server 100 and one or more client devices 200. One client device 200 is shown for purposes of brevity. In an embodiment, the steps in FIG. 2 can include steps E10, E20, E25, E30, E35, E40, and E50 implemented by a server (e.g., the server 100 in FIG. 1).

In the following description, one client device 200 is described, but the description can be applied to other client devices.

The server 100 and the client device 200 are interconnected, for example, by a communication network NET. The communication network NET may be of any type. For example, it can be a private network, a public network, a wired network, a cellular network such as 3G, 4G, 5G, or an Internet-type network.

The server 100 may be a physical server or a virtual server. The communication network NET may be or may comprise a cloud network.

The server 100 comprises a communication module M50 configured to communicate via the communication network NET with an unrepresented communication module of the client device 200.

The client device 200 may be of any nature. It may for example be a user device with represented input/output means (screen, keyboard, mouse . . . ). The 200 client device may be a personal computer, a tablet, a smartphone, etc.

The server 100 comprises a video generation module M10 configured to generate (e.g., at the step E10) a video flow $VF_{10}$ according to a scenario (e.g., a game scenario or a game). In the embodiment described here, the scenario can be defined by rules of a game. The scenario can be responsive to instructions control information (CI) received from one or more client devices 200 via the communication network NET. In an example, such as shown in FIG. 1, the video generation module M10 can be a game engine.

The server 100 may provide online gaming services to client devices 200, e.g., in a cloud computing environment.

Online games may be of different types, e.g., action games, shooter games, adventure games, role-playing games, simulation games, strategy games, cards games, board games, sport games, battle games, action games, puzzle games, and the like.

A scenario can include a plurality of scenes, and one of the plurality of scenes, referred to as "an active scene" can be played at a current time.

For example, for an online chess game, different scenes may include a scene to set a difficulty level, a scene to select black or white pieces, a scene to select an option for playing against the server or to engage in multiplayer online challenges, scenes for moving pieces on a board, scenes for help screens, scenes to display score, bonuses, and the like.

For example, in an action game, different scenes may include a scene to select and define an avatar, scenes for collecting weapons, scenes for fighting opponents, scenes for defining a battle arena and the like.

The scenes of a scenario may comprise one or more mobile of fixed graphic objects.

In an embodiment, such as described here, a scenario (e.g., each scenario), e.g., each game, can have a unique identifier (ID) (also referred to as a scenario ID or a game ID) $ID_{GS}$, and each scene of the scenario can have a unique identifier (also referred to as a scene ID) $ID_{SC}$.

In an embodiment, such as described here, a scenario (e.g., each scenario) (e.g., a game) is defined (or can be indicated) by at least one characteristics $P_{10}$ comprising one or more of:

an identifier $ID_{TY}$ of the type of scenario (also referred to as a scenario type ID), e.g., of the type of game (also referred to as a game type ID) indicating a type of the game, such as action games, shooter games, adventure games, role-playing games, simulation games, strategy games, cards games, board games, sport games, battle games, action games, puzzle games, . . . );

an identifier $ID_{GS}$ of the scenario, e.g., a game identifier;

identifiers $ID_{SC}^{i}$ of the different scenes $SC^{i}$ of the scenario where i can indicate a scene in the different scenes of the scenario;

information $V^{i}$ on a quantity of motions in the scenario or in scenes of the scenario, e.g., temporal information such as defined in the recommendation ITU-T P.910 (April 2008), e.g., characteristics of motions of graphic objects moving in a synthetic scene of a game; and/or information $N^{i}$ on a quantity of spatial details in the scenario or in scenes of the scenario, e.g., spatial information such as defined in the recommendation ITU-T P.910 (April 2008), e.g., a number of discontinuities in images of the video flow.

The server 100 can comprise a video encoder M20 configured to encode (at the step E20) the video flow $VF_{10}$ generated by the video generation module M10 and to generate an encoded video flow, e.g., a video bit stream $VF_{20}$. The video flow can include one or more pictures (also referred to as images or frames). The video encoder M20 may be of any type of encoder, for example, based on a video/image coding standard, e.g., a 2D encoder, such as in HEVC (High Efficiency Video Coding), VVC (Versatile Video Coding), AV1, and/or the like.

During a step E50, the server 100 sends the video bit stream $VF_{20}$ to the client device 200, using its communication module M50 module.

In an embodiment such as described here, both the server 100 and the client device 200 can comprise an identical decoder $M25_2$ configured to decode the video bit stream or the encoded video flow $VF_{20}$.

The decoding of the video bit stream $VF_{20}$ by the decoder $M25_2$ of the server 100 can occur during the step E25 of the video flow processing method according to some embodiments (e.g., shown in FIGS. 1-2).

Images of the video stream decoded by the decoder $M25_2$ of the client device 200 are displayed on a screen of this device (e.g., the client device 200). A gamer interacts with input/output means of this device (e.g., the client device 200) to generate instructions CI that are sent back to server 100 via the network NET.

The instructions CI are received by the communication module M50 of the server 100 and provided as an input to the video generation module (game engine) M10 and a new scene is rendered by the game engine.

The video flow $VF_{252}$ output of the decoder $M25_2$ of the server 100 is provided as an input to a module M30 configured to determine an objective quality score 1OQS of the video flow $VF_{252}$.

Alternatively, the video encoder M20 integrates (e.g., includes) a video decoder $M25_1$ configured to decode (at the step E25) the video bit stream $VF_{20}$. In this variant of the disclosure, the video flow $VF_{25_1}$ that is an output of the decoder $M25_1$ is provided as an input to the module M30.

In an embodiment such as described here, the encoded video bit stream VF20 may also be provided as an input to the module M30.

The module M30 may determine (at the step E30) an objective quality score 1OQS of the encoded bit stream $VF_{20}$ and/or of the decoded bit stream $VF_{25_1}$ or $VF_{25_2}$. The objective quality score 1OQS can be determined based on a video flow (e.g., an encoded video flow, a decoded video flow). For example, the module M30 may determine (at the step E30) the objective quality score 1OQS of the encoded bit stream $VF_{20}$, the objective quality score 1OQS of the decoded bit stream $VF_{25_1}$, or the objective quality score 1OQS of $VF_{25_2}$.

In the embodiment described here, the objective quality score 1OQS indicates an evaluation of a perceptual quality of the video flow $VF_{20}$ (encoded), $VF_{25_1}$ (decoded), or $VF_{25_2}$ (decoded), for example, in order to predict in an automatic way a subjective quality as perceived by human observers, for example, through mean opinion scores.

In the embodiment described here, the objective quality score 1OQS can be associated with an objective metric which has been predetermined to match subjective scores given by a panel of users on a set of video flows. In an embodiment, the objective metric is a full reference objective quality metric, such as VMAF. In an example, the objective metric has been designed (e.g., trained) for a general purpose, for instance, without considering gaming content, and can be applicable to a wide range of bitrates.

In another embodiment, the objective quality score 1OQS can be associated with a first objective metric which has been predetermined to match second objective scores associated with a second objective metric. The second objective metric can be more complex than the first objective metric.

The above-mentioned "subjective scores" or "second objective scores" can include target quality scores TQS described in the disclosure.

The video flow processing method can modify or update the objective quality scores 1OQS, for example, to make the objective quality scores 1OQS more accurate.

FIG. 7 shows an example of objective quality scores 1OQS, updated quality scores (or updated objective quality scores) 2OQS, and target quality scores TQS at different instants (or times) T of a video flow. FIG. 7 illustrates that the updates quality scores are closer to the target quality scores TQS than the objective quality scores. For example, at a given instant T, an absolute difference between the updated quality scores 2OQS and the target quality scores TQS is smaller than an absolute difference between the objective quality scores 1OQS and the target quality scores TQS, and the updated quality scores 2OQS can be more accurate than the objective quality scores 1OQS.

The update can rely on at least one characteristic $P_{10}$ of the scenario (or the game) GS and/or on at least one characteristic $P_{20}$ of the video encoder M20.

In the embodiment described here, the objective quality score 1OQS can be updated by using a mapping function parameterised by at least one parameter (or at least one update parameter) $a_i$ where i indicates which parameter. In various examples, the at least one parameter $a_i$ includes parameters (or updated parameters) $a_i$. The parameters $a_i$ can depend on at least one characteristic $P_{10}$ of the scenario (or the game) GS and/or on at least one characteristic $P_{20}$ of the video encoder M20.

In the embodiment described here, any suitable mapping function can be used as the mapping function, such as one of four mapping functions including a linear mapping function, a quadratic mapping function, a cubic mapping function, and a cubic mapping function described below:

a linear mapping function $MF_L$: $2OQS = a_1 \times 1OQS + a_2$;

a quadratic mapping function $MF_Q$: $2OQS = a_1 \times 1OQS^2 + a_2 \times 1OQS + a_3$;

a cubic mapping function $MF_C$: $2OQS = a_1 \times 1OQS^3 + a_2 \times 1OQS^2 + a_3 \times 1OQS + a_4$; and a logarithmic mapping function $MF_{LN}$: $2OQS = a_1 + a_2 \times \ln(1OQS)$.

In this embodiment, referring to FIGS. 1-2, the server 100 comprises a module M35 for obtaining (at the step E35) the parameters $a_i$ of a mapping function MF from the video generation module M10 and/or from the video encoder M20.

In the embodiment described here, the parameters $a_i$ or sets of parameters $a_i$ corresponding to mapping functions can be stored in a table $TAB_{10}$ of the video generation module (e.g., the game engine) M10 and can be stored in a table $TAB_{20}$ of the encoder M20.

In an embodiment, a training phase has been applied beforehand, so that sets of parameters (e.g., $\{a_1, a_2\}$, $\{a_1, a_2, a_3\}$, $\{a_1, a_2, a_3, a_4\}$ in the Tables $TAB_{10}$ and $TAB_{20}$) for different mapping functions have been learnt based on the scenario/game characteristics GS. The advantage includes that the selection of score modification information (e.g., a set of parameters) can be a straightforward action, and can be repeated frequently at a very low cost.

In an embodiment, a set of parameters (e.g., $\{a_1, a_2\}$) corresponding to a mapping function (e.g., $MF_L$) can be determined based on the at least one characteristic ($P_i$) the scenario (or the game) and/or the at least one characteristic ($P_{20}$) of the video encoder. In an example, a set of parameters (e.g., $\{a_1, a_2\}$) corresponding to a mapping function (e.g., $MF_L$) can be determined based on one or more of the at least one characteristic ($P_1$) the scenario (or the game), such as the identifier of the scenario (or the game), the identifier of a scene in the scenario, the type of the scenario (or the game), temporal information of the scenario or the scene, spatial information of the scenario or the scene, and/or the like, such as shown in FIGS. 8A-8D. In an example, a set of parameters (e.g., $\{a_1, a_2\}$) corresponding to a mapping function (e.g., $MF_L$) can be determined based on the at least one characteristic ($P_{20}$) of the video encoder, such as the type of the encoder, the bitrate range, and/or the like, such as shown in FIGS. 8E-8F.

A non-exhaustive list of mapping selection examples or different sets of parameters is shown in tables $TAB_{10}$ of FIGS. 8A to 8D.

In the embodiment of FIG. 8A, the video generation module M10 module sends update parameters $a_i$ to the module M35. The updated parameters $a_i$ can be determined according to the mapping function (e.g., $MF_L$, $MF_Q$, $MF_C$, or $MF_{LN}$) and the type of scenario (or type of the game) indicated by the identifier $ID_{TY}$ (e.g., action games, shooter games, adventure games . . . ). In an example, the type of the scenario (or the type of the game) is one of multiple types, such as indicted by TY1-TY3 in FIG. 8A. For example, if the game is of the TY3 type and the mapping function is the linear mapping function $MF_L$, the updated parameters $\{a1; a2\} = \{0.3, -0.5\}$.

In the embodiment of FIG. 8B, the video generation module M10 module sends update parameters $a_i$ to the module M35. The updated parameters $a_i$ can be determined according to the mapping function (e.g., $MF_L$, $MF_Q$, $MF_C$, or $MF_{LN}$) and the scenario (or the game). In an example, the scenario (or the game) is one of multiple scenarios (or multiple games), such as indicted by the multiple games GS1-GS2 in FIG. 8B. For example, if the game is GS1 and the mapping function is the logarithmic mapping function $MF_{LN}$, the updated parameters {a1; a2}={0.8, 0.8}.

In the embodiment of FIG. 8C, the video generation module M10 module sends update parameters $a_i$ to the module M35. The updated parameters $a_i$ can be determined according to the scenes $SC^i$ of the scenario, such as the active scene of the game. For example, if the game is GS2, the active scene is SC2, and the mapping function is the linear mapping function $MF_L$, the updated parameters {a1; a2}={1.0, 0.3}.

In the embodiment of FIG. 8D, the video generation module M10 module sends update parameters $a_i$ to the module M35. The updated parameters $a_i$ can be determined according to the information $V^i$ on a quantity of motions in the scenario or in scenes of the scenario, such as the temporal activity in the active scene of the game. In an example, if the temporal activity of the current scene is below a first threshold TH1, the updated parameters are determined using the third column in FIG. 8D; if the temporal activity of the current scene is from the first threshold TH1 to a second threshold TH2, the updated parameters are determined using the fourth column in FIG. 8D; if the temporal activity of the current scene is larger than the second threshold TH2, the updated parameters are determined using the fifth column in FIG. 8D. For example, if the temporal activity of the current scene is below a first threshold TH1, and the mapping function is the quadratic mapping function $MF_Q$, the updated parameters {a1; a2, a3}={1, −0.7, −0.1}.

The parameters $a_i$ may be sent at different temporal granularities. In an embodiment, score modification information is sent per frame. Other examples can include sending the score modification information every n frames, after a scene-cut (e.g., known from a game engine or an encoder), etc. Similarly, the score modification information can have spatial granularity. In a case where the initial metric provides different scores for different areas of a frame, specific score modification information can be used for each area. In an embodiment, the game engine can provide other relevant information to select a mapping function.

A scene-cut in the game can provide an opportunity to provide a new set of parameters to the mapping function.

In an embodiment, the table $TAB_{10}$ includes many entries. Methods can be used to reduce a signalling cost, such as a cost of sending an index. In an embodiment, the absence of information (e.g., no index being signalled) indicates that the same information (e.g., the previously sent index) that is sent previously is to be used. In an embodiment, a delta value can be sent, indicating a difference from the previously sent index. The current index can be obtained when the table (e.g., the table $T_{10}$) is properly designed, based on certain known transitions: for instance, a game switching between very fast scenes and still scenes.

The encoder M20 may have different characteristics and/or performances that can impact, for example, significantly on the quality of the encoded video flow $VF_{20}$. The mapping function can be a refinement of a provided score: adapting the parameters of the mapping function based on codec characteristics can be advantageous.

The encoder can provide "codec characteristics", for example, to control a selection of appropriate parameters (e.g., the most appropriate parameters) of a mapping function. In an embodiment, a training phase has been applied beforehand, so that sets of parameters for different mapping functions have been set, based on the codec characteristics.

A non-exhaustive list of mapping selection examples is shown in tables $TAB_{20}$ of FIGS. 8E and 8F.

In the embodiment of FIG. 8E, the video encoder M20 sends update parameters $a_i$ to the module M35. The updated parameters $a^i$ can be determined according to the type of encoder, such as an encoder based on a video/image coding standard (e.g., an AVC encoder, an HEVC encoder, a VVC encoder, a VP9 encoder, an AV1 encoder, an AVS encoder, or an encoder based on another video/image coding standard). In an example, the updated parameters $a_i$ are determined according to the type of encoder and the mapping function (e.g., $MF_L$, $MF_Q$, $MF_C$, or $MF_{LN}$). For example, if the encoder M20 is an HEVC encoder, and the mapping function is the logarithmic mapping function $MF_{LN}$, {a1; a2}={0.2, 0.9}.

In the embodiment of FIG. 8F, the video encoder M20 sends update parameters $a_i$ to the module M35. The updated parameters $a_i$ can be determined according to the type of encoder and a bitrate range (e.g., the current bitrate range). In an example, the updated parameters $a_i$ are determined according to the type of encoder, the bit rate range, and the mapping function (e.g., $MF_L$, $MF_Q$, $MF_C$, or $MF_{LN}$). For example, if the encoder M20 is an HEVC encoder, the bit rate range is [20, 30], and the mapping function is the logarithmic mapping function $MF_{LN}$, {a1; a2}={0.1, 0.4}.

In an embodiment, the server 100 comprises a module M40 configured to update (at the step E40) the objective quality score 1OQS by using the mapping function MF (e.g., $MF_L$, $MF_Q$, $MF_C$, $MF_{Ln}$) parameterized by the parameters $a_i$ received from the video generation module M10 (game engine) and/or from the encoder M20.

The updated objective quality score 2OQS can be used, for example, by a service provider (e.g., a cloud gaming service provider) to monitor the quality of the videos sent to customers of the service provider.

In an embodiment, the updated objective quality score 2OQS can be sent back to the video generation module M10 (game engine) and to the encoder M20. In another embodiment, the updated objective quality score 2OQS is sent back to the video generation module M10 or the encoder M20. In an example, the video generation module M10 can use the updated objective quality score 2OQS, for example, in generating a video flow. In an example, the encoder M20 can use the updated objective quality score 2OQS, for example, in encoding a video flow.

As shown in FIG. 1, in an embodiment, a system 10 for updating an objective quality score of a video flow can include the module M30, the module M35, and the module M40. The module M30 can determine the objective quality score 1OQS of a video flow, such as the video flow $VF_{20}$, $VF_{251}$, and/or $VF_{252}$.

The module M35 can obtain at least one update parameter $a_i$ to update the objective quality score 1OQS.

The module M40 can updating the objective quality score 1OQS by using the mapping function MF parameterized by the at least one update parameter $a_i$ The system 10 can implement the steps of the updating method (e.g., shown in FIG. 2) according to an embodiment of the disclosure.

In the embodiment shown in FIG. 1, the system 10 is embedded in the server 100. In another embodiment, the system 10 may be implemented in another server or another device that is different from the server 100.

One of more steps in FIG. 2 can be suitably adapted, such as modified and/or omitted. Additional step(s) can be added to FIG. 2. The steps in FIG. 2 can be implemented using any suitable order. FIG. 3 shows a video flow processing system according to some embodiments of the disclosure.

FIG. 4 shows a flowchart including steps of a method of processing a video according to some embodiments of the disclosure. The video flow processing system in FIG. 3 can be configured to implement a method of processing a video. The method of processing a video shown in FIG. 4 can be implemented by any suitable video flow processing system. In an embodiment, the video flow processing system in FIG. 3 is configured to implement the method of processing the video in FIG. 4, such as described in the disclosure. In an embodiment, the steps in FIG. 4 can include steps E10, E20, E35, and E50 implemented in a server (e.g., the server 100 in FIG. 3) and steps E25, E30, and E40 implemented in a client device (e.g., the client device 200 in FIG. 3).

Referring to FIGS. 3-4, as described with reference to FIGS. 1-2, the module M35 obtains the update parameters $a_i$ from the game engine M10 and/or the encoder M20.

Referring to FIGS. 3-4, the update parameters $a_i$ are sent to the client device 200 with the encoded video flow (i.e., a video bit stream) $VF_{20}$.

Referring to FIGS. 3-4, the module M30 for determining (at the step E30 in FIG. 4) the objective quality score 1OQS is embedded in the client device 200. The module M30 determines the objective quality score 1OQS by analysing the video flow $VF_{252}$ decoded by the video decoder $M25_2$.

Referring to FIGS. 3-4, the module M40 for updating (at the step E40 in FIG. 4) the objective quality score 1OQS is embedded in the client device 200.

Referring to FIGS. 3-4, the updated objective quality score 2OQS is sent back to the server 100 via the communication network NET with the instructions CI responsive to the user playing the online video game.

The updated objective quality score 2OQS and the instructions CI may be transmitted using a same channel or separate channels.

The updated objective quality score 2OQS may be transmitted to the video generation module M10 and/or the video encoder M20.

One of more steps in FIG. 4 can be suitably adapted, such as modified and/or omitted. Additional step(s) can be added to FIG. 4. The steps in FIG. 4 can be implemented using any suitable order.

FIG. 5 shows a video flow processing system according to some embodiments of the disclosure.

FIG. 6 shows in a flowchart steps of a method of processing a video according to some embodiments of the disclosure.

The video flow processing system in FIG. 5 can be configured to implement a method of processing a video. The method of processing a video shown in FIG. 6 can be implemented by any suitable video flow processing system. In an embodiment, the video flow processing system in FIG. 5 is configured to implement the method of processing the video in FIG. 4, such as described in the disclosure. In an embodiment, the steps in FIG. 6 can include steps E10, E20, and E50 implemented in a server (e.g., the server 100 in FIG. 5) and steps E25, E30, E35, and E40 implemented in a client device (e.g., the client device 200 in FIG. 5).

Referring to FIGS. 5-6, the video decoder $M25_2$ of the client device (e.g., the client device 200) obtains (e.g., determines) the update parameters $a_i$ by analysing the video flow $VF_{252}$. For example, the video decoder $M25_2$ comprises a table $TAB_{20}$ similar to the one shown in FIG. 8E or FIG. 8F.

Referring to FIGS. 5-6, the video decoder $M25_2$ provides the update parameters $a_i$ to the module M35.

The modules M30 and M40 for determining (at the step E30 in FIG. 6) the objective quality score 1OQS and for updating the objective quality scores 1OQS are embedded in the client device 200, such as described with reference to FIGS. 3-4.

The updated objective quality score 2OQS can be sent back to the server 100 via the communication network NET with the instructions CI responsive to the user playing the online video game, such as described with reference to FIGS. 3-4.

One of more steps in FIG. 6 can be suitably adapted, such as modified and/or omitted. Additional step(s) can be added to FIG. 6. The steps in FIG. 6 can be implemented using any suitable order.

In the embodiments described above, such as in FIGS. 1-6, the server 100 and the client device 200 can include a hardware architecture of a computer.

In an embodiment illustrated in FIG. 9, the server 100 comprises a processor $1_{100}$, a random access memory $3_{100}$, a read-only memory $2_{100}$, a non-volatile flash memory $4_{100}$, and/or communication means that are not shown in FIG. 9.

The read-only memory $2_{100}$ can include a recording medium according to the disclosure, readable by the processor $1_{100}$ and on which a computer program $PG_{100}$ according to the disclosure is recorded.

The computer program $PG_{100}$ can define the functional (and here software) modules of the server 100.

In the embodiment shown in FIG. 1, the functional modules can comprise:
the video generation module M10;
the encoder M20;
the decoder M25;
the module M30 for determining an objective quality score;
the module M35 for obtaining update parameters;
the module M40 for updating the objective quality score; and
the communication module M50.

In the embodiment shown in FIG. 3, the functional modules can comprise:
the video generation module M10;
the encoder M20;
the module M35 for obtaining update parameters;
the communication module M50.

In the embodiment shown in FIG. 5, the functional modules can comprise:
the video generation module M10;
the encoder M20;
the communication module M50.

As illustrated in FIG. 10, the client device 200 can comprise a processor $1_{200}$, a random access memory $3_{200}$, a read-only memory $2_{200}$, a non-volatile flash memory $4_{200}$, and/or communication means that are not shown in FIG. 10.

The read-only memory $2_{100}$ can include a recording medium according to the disclosure, readable by the processor $1_{200}$ and on which a computer program $PG_{200}$ according to the disclosure is recorded.

The computer program $PG_{200}$ can define the functional (and here software) modules of the client device 200.

In the embodiment shown in FIG. 1, the functional modules can comprise:
the decoder $M25_2$; and/or
a communication module (not shown).

In the embodiment shown in FIG. 3, the functional modules can comprise:

the decoder M25$_2$;

the module M30 for determining an objective quality score;

the module M40 for updating the objective quality score; and/or a communication module (not shown).

In the embodiment shown in FIG. 5, the functional modules can comprise:

the decoder M25$_2$;

the module M30 for determining an objective quality score;

the module M35 for obtaining update parameters;

the module M40 for updating the objective quality score; and a communication module (not shown).

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for updating an objective quality score of a video flow, comprising:

determining the objective quality score of the video flow, the video flow being generated based at least on a game scenario, the objective quality score indicating a quality of the video flow; and updating the objective quality score based on a mapping function parameterized by at least one update parameter, the at least one update parameter being dependent on at least one characteristic of the game scenario and at least one characteristic of a video encoder that is configured to encode the video flow.

2. The method according to claim 1, further comprising:

obtaining the at least one update parameter that include multiple update parameters used to update the objective quality score based on the at least one characteristic of the game scenario and the at least one characteristic of the video encoder.

3. The method according to claim 1, further comprising:

using the updated objective quality score to generate another video flow and/or to encode the other video flow.

4. The method according to claim 2, wherein prior to the determining the objective quality score, the method further includes generating the video flow based at least on the game scenario;

encoding the video flow by the video encoder;

transmitting the encoded video flow to a client device; and decoding the encoded video flow; and the determining the objective quality score includes determining the objective quality score based on the encoded video flow or the decoded video flow.

5. The method according to claim 4, wherein the generating the video flow comprises:

generating the video flow according to the game scenario and control information received from the client device.

6. The method according to claim 1, wherein the game scenario defines rules of an online game.

7. The method according to claim 4, wherein the determining the objective quality score, the decoding the encoded video flow, the obtaining the at least one update parameter, and the updating the objective quality score are performed by a server that includes the video encoder.

8. The method according to claim 1, wherein the objective quality score is associated with a predetermined first metric that has been defined using target quality scores of a set of video flows.

9. The method according to claim 8, wherein the target quality scores are subjective quality scores of the set of video flows.

10. The method according to claim 8, wherein the target quality scores are objective quality scores associated with a predetermined second metric.

11. The method according to claim 1, wherein the mapping function is a logarithmic function or a polynomial function, and coefficients of the mapping function are determined from the at least one update parameter.

12. The method according to claim 11, wherein the mapping function is a linear function, and a slope and an intercept of the linear function are determined from the at least one update parameter.

13. The method according to claim 1, wherein the at least one characteristic of the game scenario includes at least one of:

an identifier of a type of the game scenario;

an identifier of the game scenario;

an identifier of a scene of the game scenario;

temporal information of the game scenario or the scene of the game scenario; and spatial information of the game scenario or the scene of the game scenario.

14. The method according to claim 1, wherein the at least one characteristic of the video encoder includes at least one of: a type of the video encoder or a bit-rate range of the video encoder.

15. The method according to claim 2, wherein the objective quality score is determined by a client device.

16. The method according to claim 15, wherein prior to the determining the objective quality score, the video flow is generated based at least on the game scenario, the video flow is encoded by the video encoder, the encoded video flow is transmitted to the client device, the method includes decoding the encoded video flow by the client device;

the obtaining the at least one update parameter includes obtaining the at least one update parameter based on the decoded video flow by the client device; and the updating includes updating the objective quality score by the client device.

17. The method according to claim 1, wherein prior to the determining the objective quality score, the video flow is generated based at least on the game scenario by a server, the video flow is encoded by the video encoder in the server;

the at least one update parameter is obtained by the server and sent to a client device with the encoded video flow;

the mapping function is implemented by the client device to determine the updated objective quality score; and the updated objective quality score is sent to the server by the client device.

18. An apparatus for updating an objective quality score of a video flow, comprising:

processing circuitry configured to:

determine the objective quality score of the video flow, the video flow being generated based at least on a game scenario, the objective quality score indicating a quality of the video flow; and update the objective quality score based on a mapping function parameterized by at least one update parameter, the at least one update parameter being dependent on at least one characteristic of the game scenario and at least one characteristic of a video encoder that is configured to encode the video flow.

19. A video flow processing system, comprising:

a server that is configured to:

generate the video flow based at least on a game scenario;

encode the generated video flow; and transmit the encoded video flow to a client device via a network; and a client device configured to communicate with the server, wherein the server or the client device includes the apparatus according to claim 18;

the encoded video flow is decoded in the server and/or the client device;

the objective quality score is determined based on (i) the encoded video flow by the server or (ii) the decoded video flow by the server or the client device;

the objective quality score is updated by the server or the client device; and the server is configured to use the updated objective quality score.

20. A non-transitory computer-readable storage medium storing instructions which when executed by at least one processor cause the at least one processor to perform:

determining an objective quality score of a video flow, the video flow being generated based at least on a game scenario, the objective quality score indicating a quality of the video flow; and updating the objective quality score based on a mapping function parameterized by at least one update parameter, the at least one update parameter being dependent on at least one characteristic of the game scenario and at least one characteristic of a video encoder that is configured to encode the video flow.

* * * * *